United States Patent [19]

von Wietersheim et al.

[11] 4,010,881

[45] Mar. 8, 1977

[54] APPARATUS FOR THE TREATMENT OF CHIPS

[75] Inventors: Klaus von Wietersheim, Heiligenhaus, Germany; Bastiaan Maertzdorf, Schaesberg; Eduard Hendrik Schiks, Heerlen, both of Netherlands

[73] Assignee: Mayfran Incorporated, Cleveland, Ohio

[22] Filed: Aug. 11, 1975

[21] Appl. No.: 603,751

[30] Foreign Application Priority Data

Aug. 14, 1974 Germany .......................... 2439129

[52] U.S. Cl. .................................. 225/100; 225/106
[51] Int. Cl.² ............................................ B26F 3/02
[58] Field of Search ............ 225/1, 3, 93, 97, 100, 225/101, 103, 104, 106; 198/14; 29/239, 252–253, 266–267, 412–413, 426–427, 278, 283

[56] References Cited

UNITED STATES PATENTS

| | | |
|---|---|---|
| 3,239,116 | 3/1966 | Hulak ............................ 225/101 X |
| 3,540,371 | 11/1970 | Rudolph et al. ................ 198/19 X |
| 3,602,358 | 8/1971 | Jakobsson ............................ 225/3 |
| 3,866,883 | 2/1975 | Goransson ...................... 29/239 X |
| 3,895,751 | 7/1975 | Shepherd ............................ 225/3 |

*Primary Examiner*—Frank T. Yost
*Attorney, Agent, or Firm*—Meyer, Tilberry & Body

[57] ABSTRACT

A device is shown wherein the bale of metal cutting chips formed at one end of a chip conveyor is ripped apart into smaller portions which can be more easily handled in subsequent treatment operations such as separating or crushing. The device comprises a holding tooth and a ripping tooth which are pushed into the bale of chips. After extension into the bale, the ripping tooth is then moved away from the holding tooth in the conveying direction by drive means thus ripping off a portion of the bale. The teeth are then retracted and returned to their original positions. These steps are repeated until the bale has been separated into smaller portions as desired.

20 Claims, 8 Drawing Figures

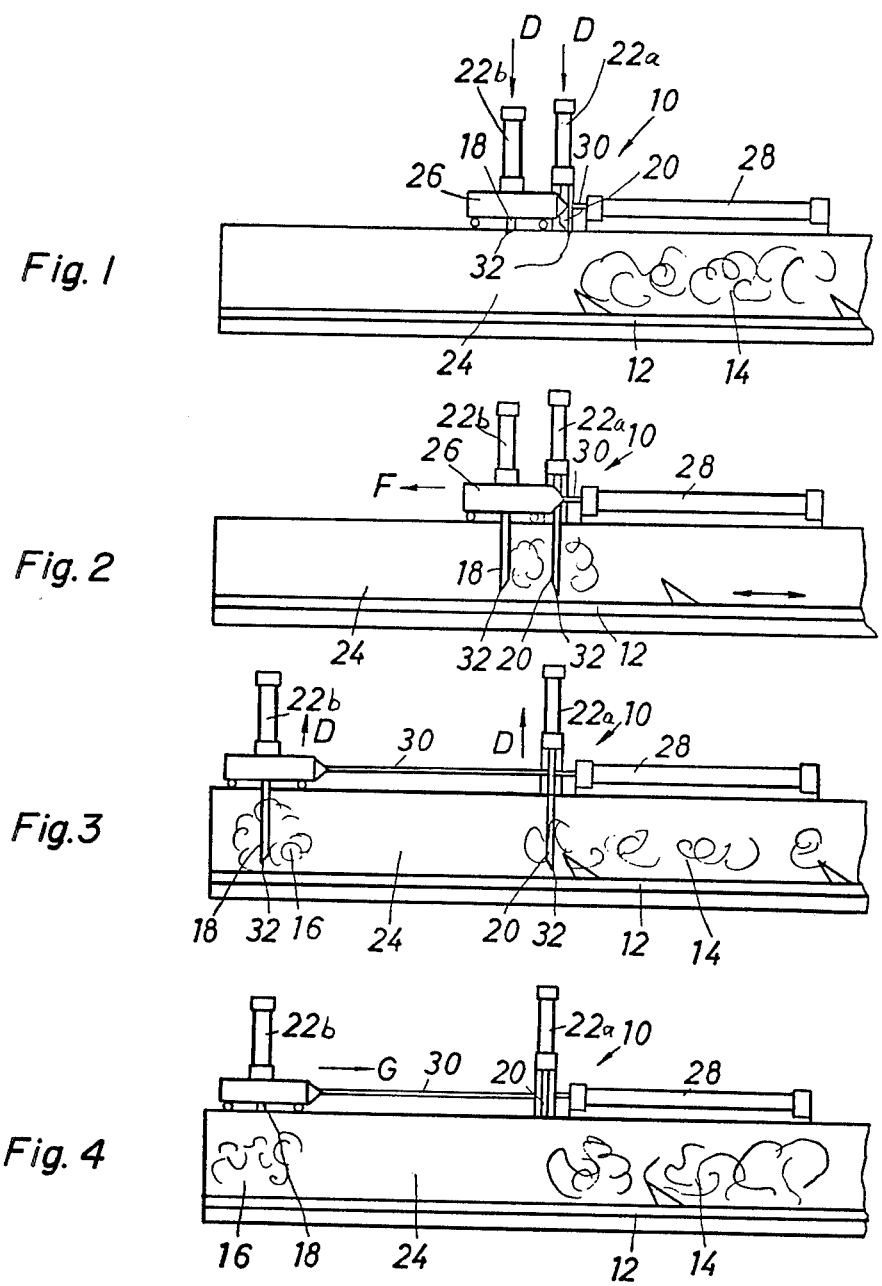

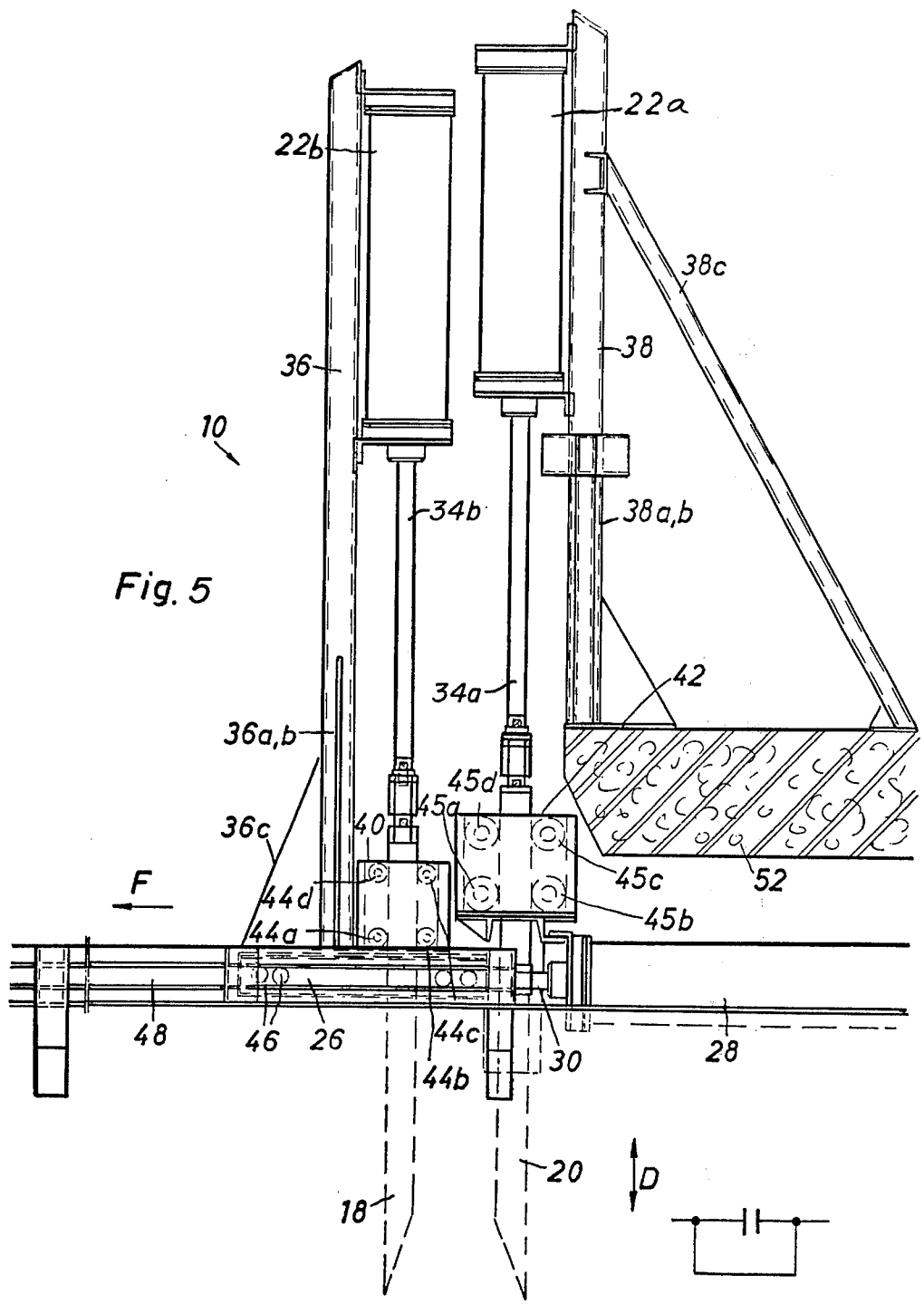

APPARATUS FOR THE TREATMENT OF CHIPS

The invention is concerned with a device for the treatment of chips which are transported by means of a preferably intermittently operating conveyor from their place of origin.

The chips accumulating in metal-cutting operations are frequently transported from their place of origin by means of a conveyor and possibly delivered for instance to a crusher or a parts separator for further processing. Such conveyors can be continuously or intermittently operating conveyors. Examples for continuously working conveyors are hinge-belt conveyors and scraper conveyors, whereas a push-rod conveyor operates intermittently. For transporting chips from their place of origin to a collecting point, push-rod conveyors are frequently used. At the end of each conveyor, the tendency for an accumulation of the chips exists which leads to a compacting of the chips in the form of bales. Such chip bales are formed in the case of a push-rod conveyor during the transport.

It is the object of the invention to create an apparatus of the afore-mentioned type which is capable of optimally treating the bales of chips accumulating by the use of such conveyors in a simple manner, possibly in a preparatory-treatment device such as a crusher or a parts separator, thus permitting the uniform dosing of portions of the bale to further processing devices or steps.

To solve this problem, it is provided that smaller chip clusters are ripped off in the conveying direction from the frontal area of the bales of chips formed in the terminal area of the conveyor.

The chip bale is in this operation preferably arrested at a predetermined distance from the point of application of the ripping forces when a chip cluster is ripped off, while preferably each ripped-off cluster is moved away from the chip bale with a speed which is higher than the transporting speed of the conveyor.

The chip clusters are, according to an advantageous further development ripped off at the end of the conveyor from the bale of chips.

An essential advantage of the invention consists in that the chips are delivered in the form of chip clusters optimally dosed to succeeding-stage devices, for instance an accumulating conveyor and/or a preparatory-treatment device.

Another advantage of the invention consists in that parts contained in the chip bales tend to accumulate in the lower layers with the breaking-up into clusters.

Moveover, an advantage of the invention consists in that, if a preparatory-treatment device is used, the chips and parts are optimally prepared for easy separation in the separator.

A device for the execution of this invention distinguishes itself in that in each case at least one ripping tooth and one holding tooth are provided which are periodically introduced into the conveying path for the chips by drive means and that the ripping tooth and the holding tooth are movable in relation to each other and that they are movable away from each other in the position in which they are introduced into the conveying path and toward each other in the position in which they are withdrawn from the conveying path.

It is advantageous to assign to each ripping tooth and to each holding tooth its own drive means. It is furthermore advisable to fasten stationarily the holding tooth with its drive means located in the rear as seen in the conveying direction, to arrange however the ripping tooth with its drive means, located in front as seen in the conveying direction on carriage means having carriage drive means so that the carriage means can be periodically moved away from the stationary holding tooth in the conveying direction and back to it.

In a further development of the invention, the carriage drive means comprises a stationary piston cylinder acted upon on both sides by a pressure medium whose piston rod is connected with the carriage means. This embodiment makes it possible in a simple manner to execute the to-and-fro motion of the ripping tooth movable in relation to the stationary holding tooth at high speed.

The stationary mounted holding tooth is preferably designed in the form of a forked double tooth, in which construction it overlaps the piston rod of the piston cylinder of the carriage drive means from above. It becomes thereby possible to bring the movable ripping tooth optimally close to the stationary holding tooth and to penetrate with these teeth into the bale of chips even in the case that the latter is only of small dimensions, so that with a fast motion of the movable ripping tooth away from the stationary holding tooth a cluster of chips is actually completely ripped off from the bale of chips.

It is particularly advantageous if according to another characteristic the initial position of the ripping tooth opposite the holding tooth is made variable by means of limiting switches. It is hereby possible to adjust the clearance between the ripping tooth in its initial position and the holding tooth in such a way that, in dependence on the kind of chips to be treated and the bale of chips formed by them, an exact dosing of the specific quantity of chips to be ripped off from the bale is achievable.

The drive means for the ripping tooth and the holding tooth consists in either case suitably of a piston cylinder acted upon by a pressure medium on both sides and stationarily set up in relation to the teeth whose piston rod is connected with the ripping tooth and the holding tooth respectively to which it belongs.

The piston cylinder of each drive means for the ripping tooth and the holding tooth is in this arrangement advantageously mounted on a tripod carrier, while each ripping and holding tooth is preferably guided in a journal bearing which is set up on the edge of the conveying path for the chips at a predetermined distance from the cylinder assigned to it.

Each ripping tooth or holding tooth respectively is suitably supported in the journal bearing assigned to it on its side in the conveying direction as well as on its side counter to the conveying direction in two points spaced from each other arranged in its motional direction at a right angle to its motional direction. In this setup each ripping tooth and holding tooth is advantageously guided by bearing rollers in the journal bearing assigned to it. On the strength of this support the ripping tooth and the holding tooth can absorb considerable forces without the piston rod transferring excessive transverse forces.

According to a further development of the invention the ripping tooth and the holding tooth with their respective drive means and the carriage means are arranged above the conveying path for the chips, in which embodiment the ripping and the holding tooth are movable downwards substantially perpendicularly to the conveying direction. Such embodiment can also be later set up in a relatively simple way in the terminal area of any already existing conveyor or between such an existing conveyor and an also already existing preparatory-treatment device.

A simple and appropriate support of the carriage means can be achieved by making it movable by means of rollers in U-rails opposite their open side which are advantageously arranged on the upper edges of a trough enclosing the transport path for the chips. In this form of execution the carriage means is safely guided in all directions perpendicular to its conveying direction.

It is moreover suitable to construct the piston rod connected with the carriage means to serve simultaneously as lever arm for the compensation of the leverage transferred from the ripping tooth to the carriage means. The movable ripping tooth with its journal bearing is in such an arrangement appropriately offset on the carriage means counter to the conveying direction, whereas the ripping tooth drive means is supported on the half of the carriage means located in the conveying direction. It becomes hereby possible to absorb satisfactorily very high forces acting upon the movable ripping tooth which exert a torsional moment on the journal bearing.

Furthermore it is advisable that the free front ends of the ripping tooth and of the holding tooth end in a point toward one longitudinal side of the tooth which is set in the case of the stationary holding tooth counter to the conveying direction and in the case of the movable ripping tooth in the conveying direction. The ripping tooth and the holding tooth can thereby easily penetrate into the bale of chips, whereas on the other hand in the act of ripping off a cluster of chips the probability of chips sliding off from the teeth becomes small.

The device according to the invention is advantageously used between the end portion of a conveyor and a preparatory-treatment device. An area is thereby obtained in which the transported chips accumulate, in which arrangement the apparatus rips off clusters of chips from this accumulation and delivers them, correctly dosed, to a subsequent preparatory-treatment device.

The apparatus is particularly suitable for an application in connection with an intermittently operating conveyor, for instance a push-rod conveyor.

BRIEF DESCRIPTION OF THE DRAWING

While the invention may take physical form in a variety of arrangements of parts, a preferred embodiment is illustrated in the accompanying drawings and hereinafter described in the specification.

FIGS. 1–4 are four side elevational views showing various operating positions of the device according to the invention, FIG. 5 is a side elevational view of the device according to FIG. 1 in which a movable ripping tooth is located in its position close to a stationary holding tooth and both teeth are shown in an extended position into the conveying path.

DESCRIPTION OF THE PREFERRED EMBODIMENT

Figure 6:
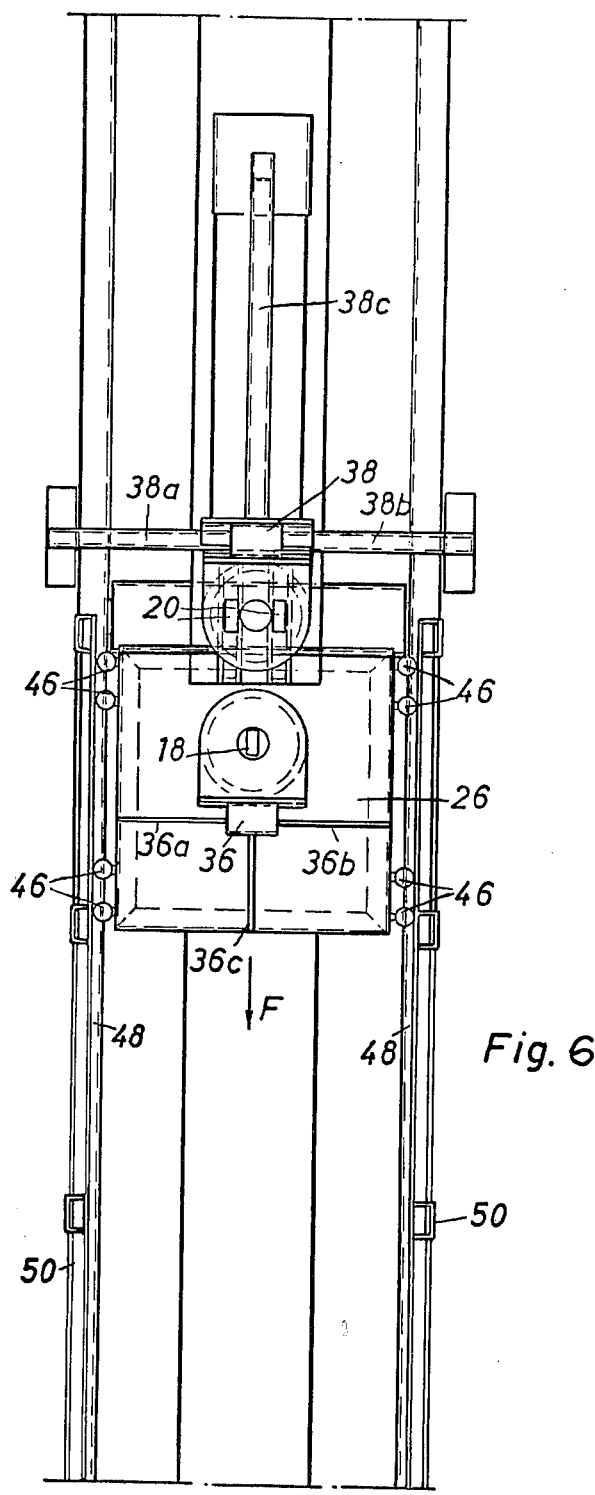
FIG. 6 is a top plan view of the portion of the device shown in FIG. 5.
Figure 7:
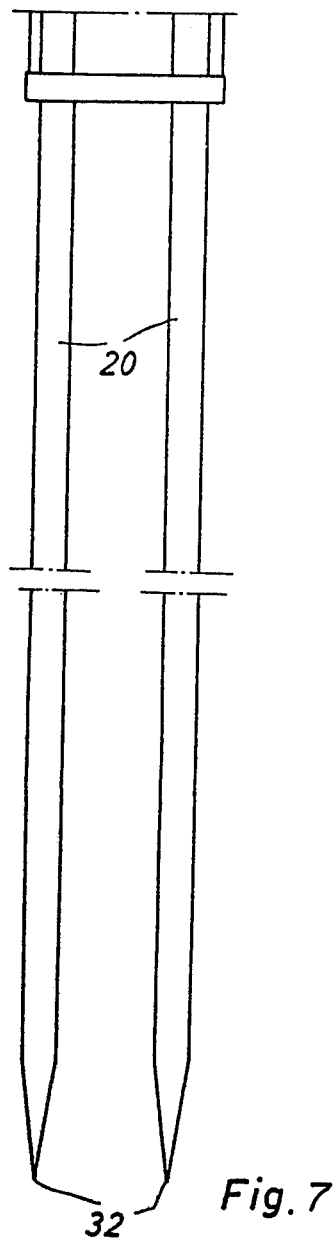
FIG. 7 is a front elevational view of the forked holding tooth and FIG. 8 is a side elevational view of the movable ripping tooth.
Figure 8:
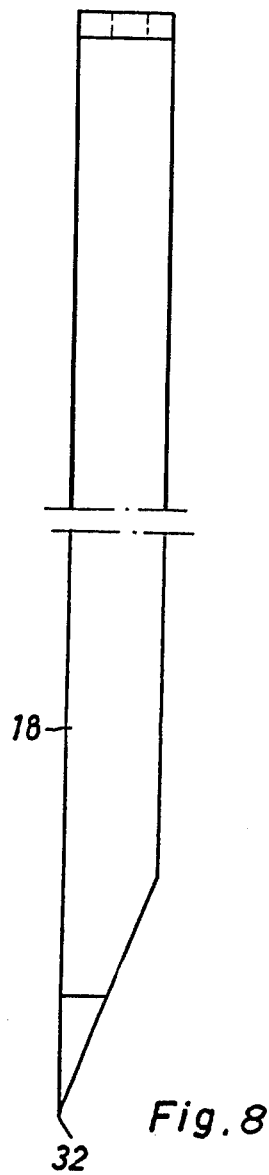

Referring now to the drawings, wherein the showings are for the purposes of illustrating a preferred embodiment of the invention only and not for purposes of limiting same FIGS. 1 to 5 show a device for ripping apart bales of chips which is set up at the end of an intermittently operating rod conveyor 12. The ripping device 10 is arranged above the conveying path 24 for chip bales 14 formed by the conveyor 12 and the area adjacent to this conveyor 12.

The ripping device 10 comprises a ripping tooth 18 and a holding tooth 20. Each tooth 18 and 20 is connected with its own drive means. The holding tooth 20 which is shown on the right in the drawing is with its drive means stationarily set up, whereas the ripping tooth 18 which is shown in the drawing on the left is mounted with its drive means on a carriage means 26. The carriage means 26 is connected with the piston rod 30 of a carriage drive means which comprises a carriage drive piston cylinder 28 and carriage drive piston rod 30. The carriage drive piston cylinder 28 and the carriage drive piston rod 30 are arranged horizontally in the conveying direction which is indicated in the drawing by the arrow F. The carriage means 26 for its part is guided by means of rollers 46 in U-rails 48 which are fastened on the upper rim of a trough 50 enclosing the chips with its longitudinal axis in the conveying direction and with its open sides directed toward each other.

Each drive means for the teeth has a vertically mounted piston cylinder 22a and 22b containing a piston rod 34a and 34b which is movable up and down by means of a pressure medium and which is connected by means of its piston rod 34a and 34b with the holding tooth 20 or the ripping tooth 18 respectively. The holding tooth piston cylinder 22a is mounted on a column 38 which is supported by means of three cross bars 38a, b and c set up at a right angle to each other above the conveyor 12 on a stationary bracket 52.

The ripping tooth piston cylinder 22b arranged on the carriage means 26 is likewise mounted on a column 36 which by means of three cross pieces 36a, b and c is supported on the front half of the carriage means as seen in the conveying direction.

The ripping tooth 18 and the holding tooth 20 are in turn guided in a journal bearing 40 and 42 respectively which bearings are set up approximately at the level of the carriage drive piston cylinder 28 or the carriage means 26 respectively. The journal bearing 40 for the movable ripping tooth 18 is mounted on the carriage means 26, whereas the journal bearing 42 for the holding tooth 20 is slightly offset upwards against the stationarily mounted carriage drive piston cylinder 28.

Each journal bearing 40 or 42 respectively has four bearing rollers 44a, b, c and d or 45a, b, c and d respectively, two of which 44a, d and 45a, d respectively are arranged on the side F in the conveying direction, and the other two bearing rollers 44b, c and 45b, c respectively on the side counter to the conveying direction of the ripping tooth 18 or the holding tooth 20 respectively. The bearing rollers 44 and 45 respectively are arranged on each side of the ripping tooth 18 and the holding tooth 20 respectively and support the ripping tooth and the holding tooth respectively at a right angle to its motional direction. The carriage drive piston rod 30 is rigidly connected with the carriage means 26 so that it forms at the same time a lever arm for the carriage means by means of which the leverage transferred from the ripping tooth over the bearing rollers 44 of the journal bearing 40 to the carriage means 26 is compensated.

The ripping tooth and the holding tooth end on their free front ends towards a longitudinal side of the tooth in a point 32 which is arranged on the holding tooth 20 counter to the conveying direction F. The holding tooth 20 is in this embodiment of a forked construction and grips from above around the carriage drive piston rod 30.

The ripping tooth 18 and the holding tooth 20 are preferably fabricated of manganese steel.

All driving mechanisms are preferably hydraulically or pneumatically operated. However, electrically operated equipment may be employed.

As shown clearly in FIG. 5, the journal bearing 42 for the holding tooth 20 is offset upwards in relation to the journal bearing 40 arranged on the carriage means 26. It is thereby possible in connection with the forked design of the holding tooth 20 to bring the carriage means 26 directly to the holding tooth 20. Since furthermore the journal bearing 40 is offset counter to the conveying direction F to such an extent as is made possible by the journal bearing 42 of the holding tooth 20, the movable ripping tooth 18 can be brought very close to the holding tooth 20. The carriage means 26 itself is utilized for the optimal support of the ripping tooth 18 in that the column 36 of the ripping tooth piston cylinder 22b steadies itself in the half of the carriage means 26 located in the conveying direction against this column 36. The depth of the vertical penetration of the ripping tooth into the bale can be adjusted by limiting switches coordinated to the vertical cylinders 22a and b in order to make an adaptation to the chip bales possible (not shown).

The carriage means 26 shows on its sides perpendicular to the conveying direction F at its end aiming into the conveying direction as well as at its end aiming counter to the conveying direction two rollers 46 which in their U-rails 48 are guided in vertical as well as horizontal direction at a right angle to the conveying direction F. The initial position of the carriage means 26 and with it of the ripping tooth 18 opposite the holding tooth 20 can be adjusted by limiting switches which are for instance fastened on the U-rails 48 and cooperate with the carriage means (not shown).

The mode of operation of the device shall now be described in detail on the basis of the FIGS. 1 to 4.

The rod conveyor 12 shown therein has the characteristic of compressing the transported chips into chip bales 14. These chip bales 14 are transported by the rod conveyor 12 to its end, shown in the right half of FIGS. 1 to 4. Immediately behind the end of the rod conveyor 12 is arranged the holding tooth 20. According to FIG. 1 when the movable ripping tooth 18 is with its carriage means 26 immediately brought up to the holding tooth 20, the teeth are extended into the conveying path 24. As soon as the teeth are completely extended, the carriage means 26 with the movable ripping tooth 18 is forced by the carriage drive means 28 in the conveying direction F, as indicated in FIG. 2 by the arrow F. A cluster of chips 16 is thereby torn off from the chip bale 14 while the remainder of the chip bale 14 is retained by the extended holding tooth 20. As soon as the carriage means 26 with the movable ripping tooth 18 has reached its extreme position, which is shown in FIG. 3, ripping and holding teeth 18 and 20 are retracted to their initial position and thereby removed from the conveying path 24. The carriage means 26 is, as indicated in FIG. 4 by the arrow G, immediately returned to the holding tooth 20. This end position is shown in FIG. 1. Thereupon the same cycle is repeated.

Because of the arrangement of the journal bearings 40 and 42 directly above the conveying path 24 and the support of the teeth 18 and 20 respectively, on their bearing rollers 44 and 45 respectively, in an arrangement that keeps them at a distance from each other on their sides facing the conveying direction F and counter to the conveying direction F in their motional direction, high ripping forces can be absorbed by the teeth 18 and 20 without the danger of excessively high forces being transferred by the piston rods 34a and b to the coordinated piston cylinders 20a and b.

Since the movable ripping tooth 18 can be brought very close to the holding tooth 20, the teeth are, after they penetrate into a chip bale and immediately prior to the beginning of the ripping action, at a very close distance to each other. This guarantees that the movable ripping tooth 18 actually rips off completely a cluster of chips 16 from the chip bale held by the holding tooth 20. Thus, because of the small clearance between the teeth in the conveying direction F prior to the beginning of the ripping action, only a small area of elasticity is left in the compacted chips which, with the provided length of the working stroke of the traveling carriage, is exceeded so that, in reality, a complete tearing-off results.

What is claimed is:

1. A device for separating bales of metal cutting chips formed on a chip conveyor having a conveying direction comprising:
    at least one holding tooth positioned along the conveyor and spaced therefrom and selectively movable toward and away from said conveyor; said holding tooth being adapted to penetrate a bale of chips on said conveyor when moved toward said conveyor;
    at least one ripping tooth positioned along said conveyor having a first position adjacent to said holding tooth and movable in said conveying direction; said ripping tooth being selectively movable toward and away from said conveyor; said ripping tooth being adapted to penetrate said bale of chips on said conveyor when moved toward said conveyor;
    first drive means associated with said holding tooth and said ripping tooth to move said teeth toward and away from said conveyor and;
    second drive means independent of said first drive means for moving said ripping tooth laterally away from said holding tooth to a second position when said teeth have been moved toward said conveyor whereby portions of said bale of chips may be torn away.

2. The device as described in claim 1 wherein said ripping tooth is mounted on carriage means moveable along said conveyor.

3. The device as described in claim 2 wherein said holding tooth is stationary relative to said conveying direction and said second drive means acts only on said carriage means.

4. The device as described in claim 3 wherein said second drive means comprises a hydraulic piston and rod assembly.

5. The device as described in claim 3 wherein said second drive means comprises a pneumatic piston assembly.

6. The device as described in claim 3 including limit switch means arranged to adjustably control said first position.

7. The device as described in claim 1 wherein said device is situated at the end of said chip conveyor.

8. The device as described in claim 1 wherein said holding tooth is a forked double tooth.

9. The device as described in claim 1 wherein said device is positioned above said conveyor.

10. The device as described in claim 1 wherein both said holding tooth and said ripping tooth are pointed.

11. The device as described in claim 10 wherein the point of said ripping tooth is set in the conveying direction and the point of said holding tooth is set counter the conveying direction.

12. The device as described in claim 1 wherein both said holding tooth and said ripping tooth are fabricated of manganese steel.

13. The device as described in claim 1 wherein said first and second drive means are electrically operated.

14. The device as described in claim 1 wherein said device is associated with said conveyor which is intermittently operating.

15. A device for separating bales of metal cutting chips formed on a chip conveyor having a conveying direction comprising:
   at least one holding tooth positioned along the conveyor and spaced therefrom and selectively movable toward and away from said conveyor; said holding tooth being adapted to penetrate a bale of chips on said conveyor when moved toward said conveyor;
   at least one ripping tooth positioned along said conveyor having a first position spaced from said holding tooth in said conveying direction; said ripping tooth being selectively movable toward and away from said conveyor; said ripping tooth being adapted to penetrate a bale of chips on said conveyor when moved toward said conveyor;
   first drive means associated with said holding tooth and said ripping tooth to move said teeth toward and away from said conveyor, said first drive means comprising holding tooth drive means and ripping tooth drive means, and;
   second drive means for moving said ripping tooth laterally away from said holding tooth to a second position when said teeth have been moved toward said conveyor whereby portions of said bale of chips may be torn away.

16. The device as described in claim 15 wherein said holding tooth drive means is stationary relative to said conveying direction and said ripping tooth drive means is mounted on carriage means moveable along said conveyor between said first and second position by the action of said second drive means.

17. The device as described in claim 15 which further includes a journal bearing associated with each of said holding tooth and said ripping tooth, said holding tooth and ripping tooth each passing within their respective bearings as they are extended and retracted.

18. The device as described in claim 15 wherein said holding tooth drive means and said ripping tooth drive means comprise piston and rod assemblies.

19. The device as described in claim 18 wherein said piston and rod assemblies are hydraulically operated.

20. The device as described in claim 18 wherein said piston and rod assemblies are pneumatically operated.

* * * * *